US009709698B2

(12) United States Patent
Nykl et al.

(10) Patent No.: US 9,709,698 B2
(45) Date of Patent: Jul. 18, 2017

(54) WAKE TURBULENCE ANALYZER FOR REAL-TIME VISUALIZATION, DETECTION, AND AVOIDANCE

(75) Inventors: Scott Larson Nykl, Athens, OH (US); Chad Lee Mourning, Middleport, OH (US)

(73) Assignee: Ohio University, Athens, OH (US)

( * ) Notice: Subject to any disclaimer, the term of this patent is extended or adjusted under 35 U.S.C. 154(b) by 793 days.

(21) Appl. No.: 14/125,132

(22) PCT Filed: Jun. 11, 2012

(86) PCT No.: PCT/US2012/041863
§ 371 (c)(1),
(2), (4) Date: Jan. 8, 2014

(87) PCT Pub. No.: WO2012/170991
PCT Pub. Date: Dec. 13, 2012

(65) Prior Publication Data
US 2014/0136110 A1   May 15, 2014

Related U.S. Application Data (60) Provisional application No. 61/495,621, filed on Jun. 10, 2011.

(51) Int. Cl.
  *G01W 1/00* (2006.01)
  *G01W 1/02* (2006.01)
  *G08G 5/00* (2006.01)

(52) U.S. Cl.
  CPC ............ *G01W 1/02* (2013.01); *G08G 5/0008* (2013.01); *G08G 5/0021* (2013.01); *G08G 5/0078* (2013.01); *G08G 5/0091* (2013.01)

(58) Field of Classification Search
None
See application file for complete search history.

(56) References Cited

U.S. PATENT DOCUMENTS

| 8,135,500 B1 * | 3/2012 | Robinson | G01C 23/00 701/14 |
| 2008/0255714 A1 * | 10/2008 | Ross | G01S 7/003 701/14 |

(Continued)

FOREIGN PATENT DOCUMENTS

WO    2007115359 A1    10/2007

OTHER PUBLICATIONS

United States Patent and Trademark Office; Search Report and Written Opinion in International Application No. PCT/US2012/041863, dated Aug. 31, 2012; 9 pp.

*Primary Examiner* — David M Gray
*Assistant Examiner* — Geoffrey T Evans
(74) *Attorney, Agent, or Firm* — Wood Herron & Evans LLP (57) ABSTRACT

A computer method for determining potential wake turbulence by a first aircraft from wake generated by a second aircraft. The computer method includes receiving a signal generated by the second aircraft at the first aircraft and transforming the signal to a first wake turbulence boundary that represents the wake generated by the second aircraft. An intersection volume, which is representative of a zone of dangerous turbulence interactions, is selected for the first aircraft. Based on a determination of intersection between the first wake turbulence boundary and the intersection volume, issuing a warning flag if an intersection exists or continue generating the first wake turbulence boundary and determining whether interactions exist.

17 Claims, 9 Drawing Sheets

(56) References Cited

U.S. PATENT DOCUMENTS

2009/0009393 A1\* 1/2009 Tillotson ................ G01W 1/02
  342/378
2011/0004398 A1 1/2011 Stayton et al.
2011/0018742 A1 1/2011 Georges et al.
2015/0381927 A1\* 12/2015 Mourning ............... G06T 17/05
  386/328

\* cited by examiner

WAKE TURBULENCE ANALYZER FOR REAL-TIME VISUALIZATION, DETECTION, AND AVOIDANCE

CROSS-REFERENCE TO RELATED APPLICATIONS

The application claims priority to International Patent Application No. PCT/US2012/041863 (pending), filed Jun. 11, 2012, which claims priority to U.S. Provisional Patent Application Ser. No. 61/495,621, filed Jun. 10, 2011, each of which is expressly incorporated herein by reference in its entirety.

FIELD OF THE INVENTION

The present invention relates to devices and methods of calculating wake turbulence and, more particularly, to wake turbulence avoidance.

BACKGROUND OF THE INVENTION

Flying aircraft create localized disturbances in the space through which it flies. These disturbances, known as wake turbulence, include vortices created at each wing tip of the aircraft and may persist for up to several minutes. Thus, wake turbulence creates an unseen, dangerous flight condition for any aircraft passing through the disturbance.

Because there is no instrumentation configured to detect wake turbulence, conventional visual flight rules require the pilot to track leading aircraft and mentally extrapolate the leading aircraft's flight path to their own aircraft to estimate the turbulence. Avoidance is practiced by flying above the mentally extrapolated flight path in flight and touching down further along the runway than a previously landed aircraft. Conventional instrument flight rules place the burden of tracking potential disturbances on air traffic control to identify and warn each aircraft of potential wake turbulence and provide a possible, alternate final approach path.

Yet, there are a number of factors that affect the magnitude, longevity, and location of the wake turbulence, including, for example, relative size of the leading aircraft as compared to the trailing aircraft, the flight path and orientation of the trailing aircraft, air of the vortices, weather conditions (light winds, updrafts, etc.), and the experience level of the trailing aircraft's pilot. Simulation and modeling of wake turbulence have provided Reduced Separation Systems ("RSS") that are used in limited amounts by air traffic control stations of few airports worldwide. RSS estimates wake turbulence and inter-aircraft spacing that safely reduces spacing between landing and taking-off aircraft while minimizing dangerous wake and maximizing runway capacity. Still, RSS is not implemented worldwide and is only used at airports, i.e., not during in-flight travel.

Thus, there remains a need for a system configured to track and/or estimate wake turbulence and to convey information with respect thereto to the pilot of a trailing aircraft such that the trailing aircraft may safely avoid the dangerous disturbances, particularly during in-flight travel.

SUMMARY OF THE INVENTION

The present invention overcomes the foregoing problems and other shortcomings and drawbacks of the known, conventional methods of avoiding wake turbulence. While the present invention will be described in connection with certain embodiments, it will be understood that the present invention is not limited to these embodiments. To the contrary, this invention includes all alternatives, modifications, and equivalents as may be included within the scope of the present invention.

According to one embodiment of the present invention is directed to a computer method for determining potential wake turbulence for a first aircraft from wake generated by a second aircraft includes receiving a signal generated by the second aircraft at the first aircraft and transforming the signal to a first wake turbulence boundary that represents the wake generated by the second aircraft. An intersection volume, which is representative of a zone of dangerous turbulence interactions, is selected for the first aircraft. Based on a determination of intersection between the first wake turbulence boundary and the intersection volume, issuing a warning flag if an intersection exists or continue generating the first wake turbulence boundary and determining whether an intersection exists.

Another embodiment of the present invention includes a computer method for determining potential wake turbulence for a first aircraft from wake generated by a second aircraft includes generating a wake turbulence boundary that represents the wake generated by the second aircraft. If it is determined that a flight plan of the first aircraft intersects with the wake turbulence boundary of the second aircraft, then a warning flag is issued. If no intersection exists, then generating the first wake turbulence boundary and determining whether an intersection exists continues.

Still another embodiment of the present invention includes a computer method for determining potential wake turbulence for a first aircraft from wake generated by a second aircraft includes receiving a signal generated by the second aircraft at the first aircraft and transforming the signal to a first wake turbulence boundary that represents the wake generated by the second aircraft. The existence of intersections between a flight plan of the first aircraft and the wake turbulence boundary of the second aircraft are determined and the relatedness of the wake turbulence boundary to the flight plan is shown on an indicator.

Another embodiment of the present invention is directed to a computer method for determining potential wake turbulence for a first aircraft from wake generated by a second aircraft includes receiving a signal generated by the second aircraft at the first aircraft and transforming the signal to a first wake turbulence boundary that represents the wake generated by the second aircraft. An intersection volume, which is representative of a zone of dangerous turbulence interactions, is selected for the first aircraft. An intersection between the wake turbulence boundary and the intersection volume is determined. An altimeter displays the altitude of the first aircraft with an altitude of the wake turbulence boundary.

One embodiment of the present invention is directed to a computer program product comprising a computer useable medium with a computer readable program code embodiment therein. The computer program product, when executed, causes a computer to execute methods of the invention.

Another embodiment of the present invention includes a wake visualization instrument that evaluates a flight of a first aircraft relative to the wake generated by a second aircraft with a computer program product according to other embodiments of the present invention. The wake visualization instrument thus includes a calculating unit that is programmed with the computer program product and having at least one processor, at least one memory, at least one mass storage device, at least one receiver for receiving signals from the second aircraft, and at least one user interface for displaying the relatedness of the wake turbulence boundary to the flight.

In accordance with one embodiment of the present invention, a wake visualization instrument includes a receiver, a computer, and an indicator. The receiver is configured to receive at least one signal from a second aircraft. The computer is configured to transform that at least one signal into a wake turbulence boundary and determine a relation between the wake turbulence boundary and the first aircraft. The indicator displays the relation.

BRIEF DESCRIPTION OF THE DRAWINGS

The accompanying drawings, which are incorporated in and constitute a part of this specification, illustrate embodiments of the present invention and, together with a general description of the invention given above, and the detailed description given below, serve to explain the invention.

DETAILED DESCRIPTION

Figure 1:
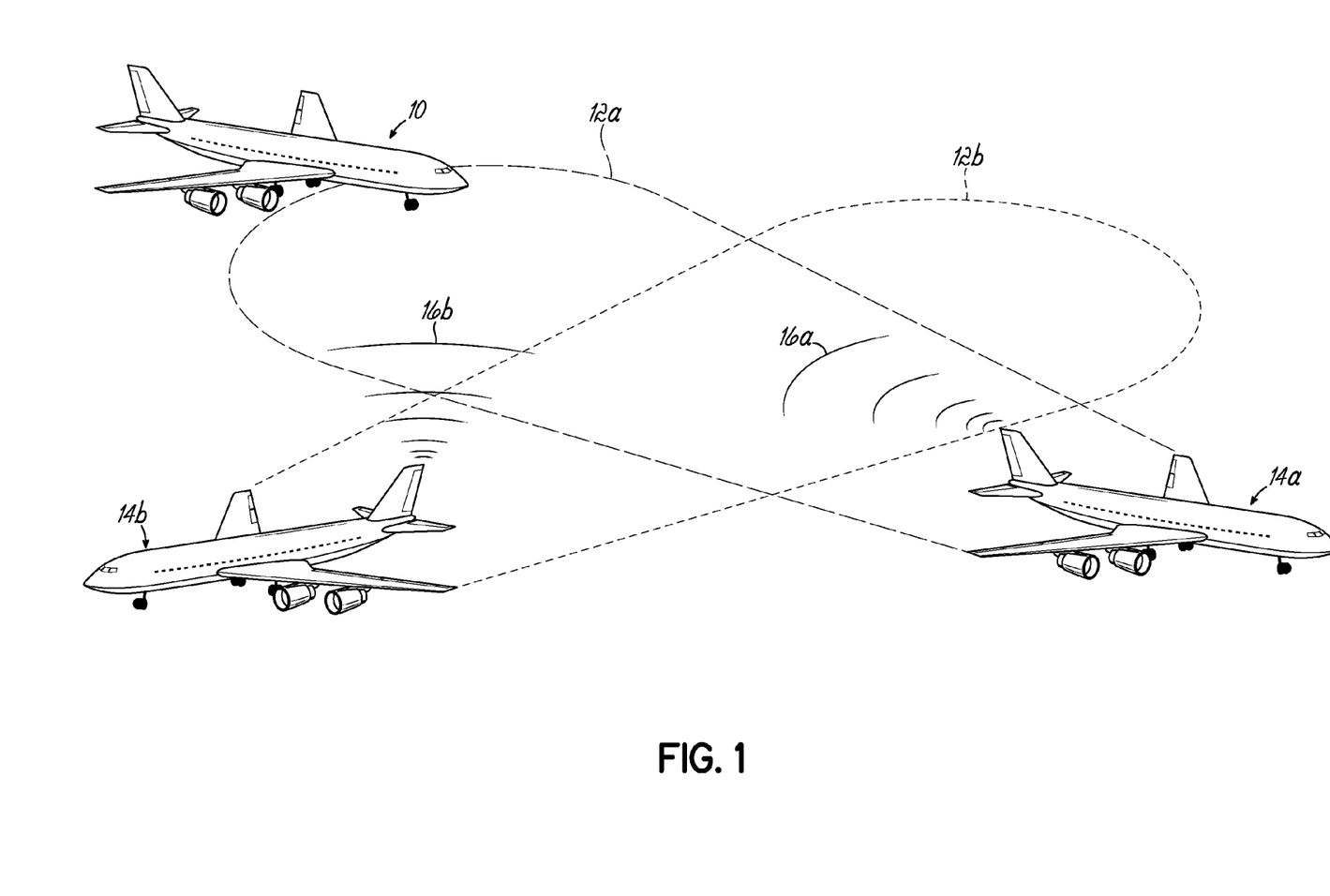
FIG. 1 is a schematic illustration of a trailing aircraft flying toward the wake turbulences generated by leading aircrafts.

With reference now to the figures, and in particular to FIG. 1, a trailing aircraft 10 is shown in a position poised to enter the wake turbulence 12 created by leading aircraft 14 (two leading aircraft 14a, 14b, each with a resultant wake turbulence 12a, 12b are shown). It would be readily appreciated that a leading aircraft, as defined herein, may be any aircraft positioned to generate a wake turbulence that is within the flight plan of the trailing aircraft 10.

Each aircraft 10, 14a, 14b may be configured to transmit a signal 16a, 16b (transmitted signal is not shown for the trailing aircraft 10) representing one or more details of the aircraft 14a, 14b from which the signal 16a, 16b is transmitted, including, but not limited to one or more of altitude, aircraft number, vertical velocity relative to Earth, and horizontal velocity relative to Earth. According to one exemplary embodiment of the present invention, the signal 16a, 16b may comprise an Automatic Dependent Surveillance-Broadcast ("ADS-B") Out signal, which was developed by the Federal Aviation Administration of the U.S. Department of Transportation, details of which are provided in "Automatic Dependent Surveillance-Broadcast (ADS-B) Out Performance Requirements To Support Air Traffic Control (ATC) Service," Federal Register (May 28, 2010) Vol. 75, No. 103, Pages 30160-30195, the disclosure of which is incorporated herein by reference in its entirety.

Figure 2:
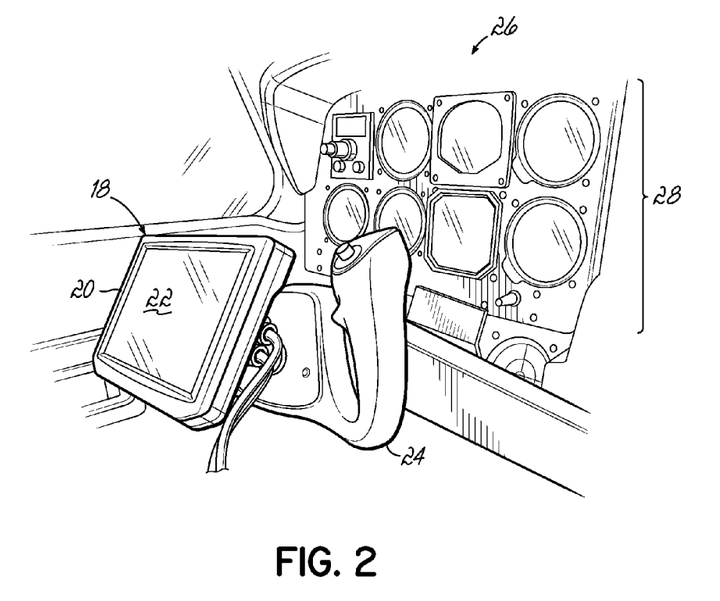
FIG. 2 is a schematic illustration of an instrument panel of the trailing aircraft with wake visualization instrumentation in accordance with one embodiment of the present invention.
Figure 3:
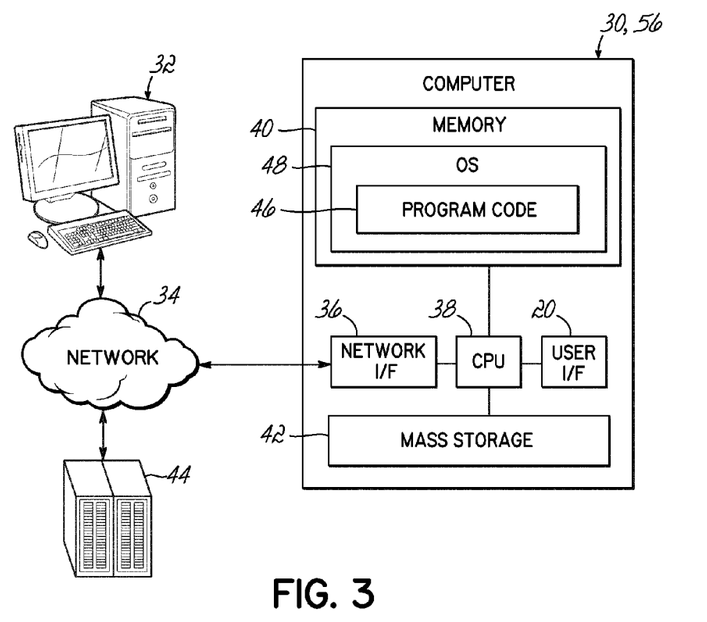
FIG. 3 is a schematic illustration of a computer operably with the wake visualization instrumentation of FIG. 2 and in accordance with one embodiment of the present invention.

To avoid wake turbulence, and in accordance with one embodiment of the present invention as described herein, the trailing aircraft 10 includes wake visualization instrumentation 18, shown in FIGS. 2 and 3, which is configured to receive the transmitted signals 16a, 16b and to generate an output that is indicative to the wake turbulence 12a, 12b resulting from the leading aircraft 14a, 14b. The wake visualization instrumentation 18 may include a user interface 20 that is configured to display a suitable indicator of the wake turbulence output and/or receive pilot input and may include, for example, a touch screen LCD monitor 22 operably coupled to the control stick 24 within the cockpit 26 as shown. In this way, the output may be displayed within the pilot's line of sight of the instrument panel 28. However, the output may be displayed in other ways, including direct incorporation within the instrument panel 28.

To generate outputs, each aircraft 10, 14a, 14b includes a computer (referenced as computer 30 for trailing aircraft 10 and computer 56 for leading aircraft 14a, 14b), one embodiment of which is shown and described with reference to FIG. 3. The computer 30, 56 may be considered to represent any type of computer, computer system, computing system, server, disk array, or programmable device such as multi-user computers, single-user computers, handheld devices, networked devices, or embedded devices, etc. The computer 30, 56 may also be referred to as a "computer" for brevity's sake, although it should be appreciated that the term "computing system" may also include other suitable programmable electronic devices consistent with embodiments of the present invention.

The computer 30, 56 may be implemented with one or more networked computers 32 using one or more networks 34, for example, a satellite system or other wired or wireless connection, through a network interface (illustrated as "NETWORK I/F" 36).

The computer 30, 56 typically includes at least one processing unit (illustrated as "CPU" 38) coupled to a memory 40 along with several different types of peripheral devices, e.g., a mass storage device 42 having one or more databases (not shown), the user interface (illustrated as "USER I/F" 20), and the Network I/F 36.

The memory 40 of the computer 30, 56 may include dynamic random access memory ("DRAM"), static random access memory ("SRAM"), non-volatile random access memory ("NVRAM"), persistent memory, flash memory, at least one hard disk drive, and/or another digital storage medium. The mass storage device 42 is typically at least one hard disk drive and may be located externally to the computer 30, 56, such as in a separate enclosure or in one or more networked computers 32 and/or one or more networked storage devices 44 (including, for example, a tape or optical drive).

The CPU 38 may be, in various embodiments, a single-thread, multi-threaded, multi-core, and/or multi-element processing unit (not shown) as is well known in the art. In alternative embodiments, the computer 30, 56 may include a plurality of processing units that may include single-thread processing units, multi-threaded processing units, multi-core processing units, multi-element processing units, and/or combinations thereof as is well known in the art. Similarly, the memory 40 may include one or more levels of data, instruction, and/or combination caches, with caches serving the individual processing unit or multiple processing units (not shown) as is well known in the art.

The memory 40 of the computer 30, 56 may include one or more applications (illustrated as "Program Code" 46), or other software program, which are configured to execute in combination with an Operating System (illustrated as "OS" 48) and operating in accordance with one or more embodiments of the present invention, with or without accessing further information or data from the database(s) of the mass storage device 42 or via the network 34.

Those skilled in the art will recognize that the environment illustrated in FIG. 3 is not intended to limit the present invention. Indeed, those skilled in the art will recognize that other alternative hardware and/or software environments may be used without departing from the scope of the invention.

As is shown, each computer 30, 56 may include a visualization engine, which is a program code 46 (FIG. 3) configured to receive data from the aircraft's altimeter (illustrated as altimeter 58 for both the leading and trailing aircrafts 10, 14a, 14b) and the global positioning system (illustrated as "GPS" 60 for both the leading and trailing aircrafts 10, 14a, 14b) and to generate a visual representation of the aircraft's position. While the visualization engine 46 (FIG. 3) may be comprised any of any program code that is suitable for combining, in real time, a number of inputs from the user's aircraft (particularly the pilot of the trailing aircraft 10) and leading aircrafts 14a, 14b and generating a graphical output that is a virtual replica the aircraft 10, 14a, 14b, one suitable example of a visualization engine may be the STEAMiE visualization engine, which is described in detail in NYKL, S. et al., "An overview of the STEAMiE educational game engine," in: Frontiers in Education Conference, 2008. FIE 2008. 38$^{th}$ Annual, IEEE (2008) F3B-21, the disclosure of which is incorporated herein by reference in its entirety. STEAMiE utilizes a three-dimensional graphics technology, such as OpenGL 4.3 (Silicon Graphics International Corporation, Fremont, Calif.) to create vivid, immersive, interactive worlds and provides a mechanism to animate objects within the virtual world, for example as applied herein, the trailing and leading aircraft 10, 14a, 14b and the resulting wake turbulence 12a, 12b.

The visualization engine 46 (FIG. 3) may further include an algorithm that is configured to simulate and/or track wake turbulences 12a of leading aircrafts 14a, 14b and/or the aircraft's own wake turbulence. The tracking algorithm may be a high fidelity model such as the model described in U.S. Pat. No. 6,963,291, entitled DYNAMIC WAKE PREDICTION AND VISUALIZATION WITH UNCERTAINTY ANALYSIS, and issued to Holforty et al. on Nov. 8, 2005, the disclosure of which is incorporated herein by reference in its entirety. Briefly, the wake turbulence is calculated from algorithms that predict wake vortices in real time.

In still other embodiment of the present invention, such as to conserve computational power or resources, a conservative model of wake turbulence may be used. As used herein, conservative indicates that the model is making of one or more cautiously moderate assumptions regarding the behavior of wake turbulences. In one such conservative model, wake turbulence is based on a highest nearby point of a corresponding leading aircraft 14a, 14b and will only descend with minimal lateral movement. Generally this assumption is valid but for those instances of severe updrafts.

Figure 5:
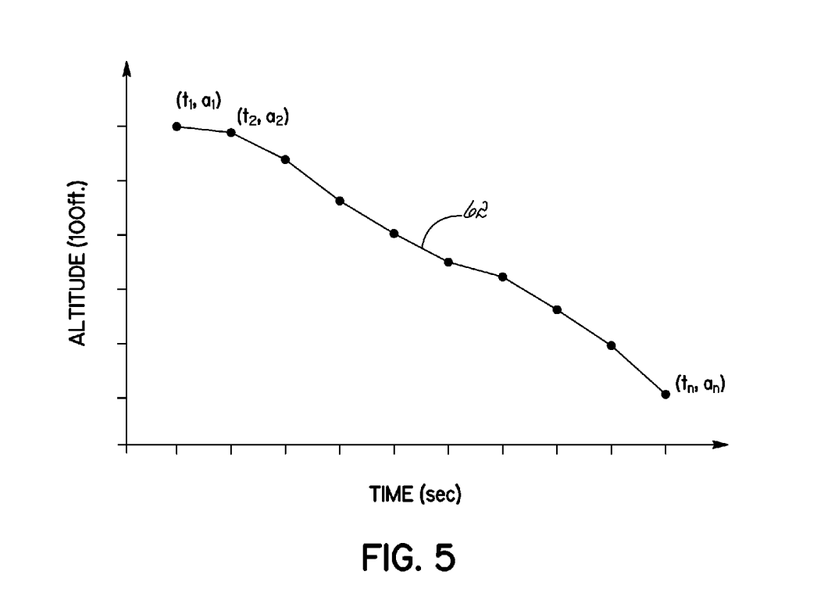
FIG. 5 is an exemplary graphical representation of the wake turbulence surface boundary of a leading aircraft as determined by a conservative wake turbulence model and according to one embodiment of the present invention.

FIG. 5 graphically illustrates the highest nearby point of the leading aircraft 14a (FIG. 1) from $t_1$ to $t_n$, and during which the leading aircraft 14a (FIG. 1) descends from an altitude of $a_1$ to an altitude of $a_n$, for example, during final approach. Over the interval of $t_1$ to $t_n$, the altitude of the leading aircraft 14a (FIG. 1) is sampled at regular time intervals (for example, 1 Hz) to obtain a plurality of signals, each representing an altitude of the leading aircraft at that respective time: $(t_1, a_1)$, $(t_2, a_2)$, and so forth. If an aircraft is tracking its own wake, the signal from the aircrafts altimeter 58 (FIG. 3) may sampled and be evaluated over time; if a trailing aircraft 10 is tracking a leading aircraft 14a, 14b, the computer 30 of the trailing aircraft 10 will sample the broadcasted signal 16a, 16b of the leading aircraft 14a, 14b. Together, the plurality of signals defines an upper boundary surface 62 of the wake turbulence 12a, 12b generated by the leading aircraft 14a, 14b. In the simplest case, the wake extends vertically from the upper boundary surface 62 toward the earth, defining a volume of wake turbulence.

In some embodiments of the present invention, and in-fact, in reality, the wake drifts from its point of origin, vertically and/or horizontally relative to the Earth. While downwardly-directed drift occurs naturally, even in stagnant air conditions, upwardly-directed drift is possible during updrafts. Horizontally-directed, or lateral, drift may be uniform but more typically is non-uniform as wind blows across the surface of the earth, thus drawing the drift in a particular north, east, south, or west direction. The direction and magnitude of the drift may vary with time, all of which increase the complexity of modeling the turbulence. To simplify the model, drift in one or both of the vertical and/or lateral directions may be set to a constant value or vary based on environmental conditions such as wind speed, humidity, wind direction, and so forth or the size/shape of the second aircraft as determined from the broadcasted aircraft number. In any event, at least one vertical boundary surface (not shown) of the wake due to drift may extend from the upper boundary surface 62 toward the Earth. With the upper boundary surface 62, the vertical boundary surface defines a larger volume of wake turbulence as compared to the simpler model described above, requiring greater computational power, but also increasing the accuracy of wake turbulence determination and avoidance.

Figure 6A:
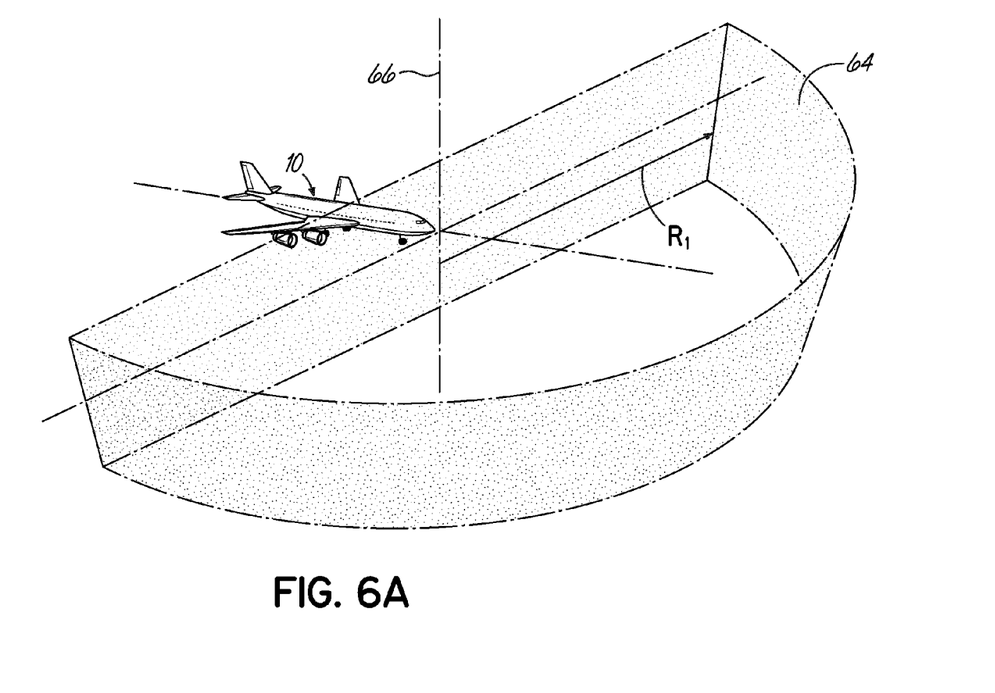
FIGS. 6A and 6B are exemplary intersection volumes for a trailing aircraft providing avoidance of nearby wake turbulence in accordance with one embodiment of the present invention.

The trailing aircraft 10 need not make direct impact with the volume of wake turbulence for a dangerous consequence to result. Instead, a danger zone or volume surrounding at least a portion of the trailing aircraft 10 should avoid nearby turbulence to effectively reduce the potential for danger. This danger zone, otherwise references as an intersection volume, surrounds the trailing aircraft 10 and has a desired shape extending away from the trailing aircraft 10. For example, in FIG. 6A, the intersection volume 64 is semi-cylindrical in shape, having a lengthwise axis 66 aligned with the gravitational force and centered on the heading vector (not shown) of the trailing aircraft 10. The radius, $R_1$, of the semi-cylinder may be designated any distance that provides a safe spatial distance for wake turbulence avoidance.

Figure 6B:
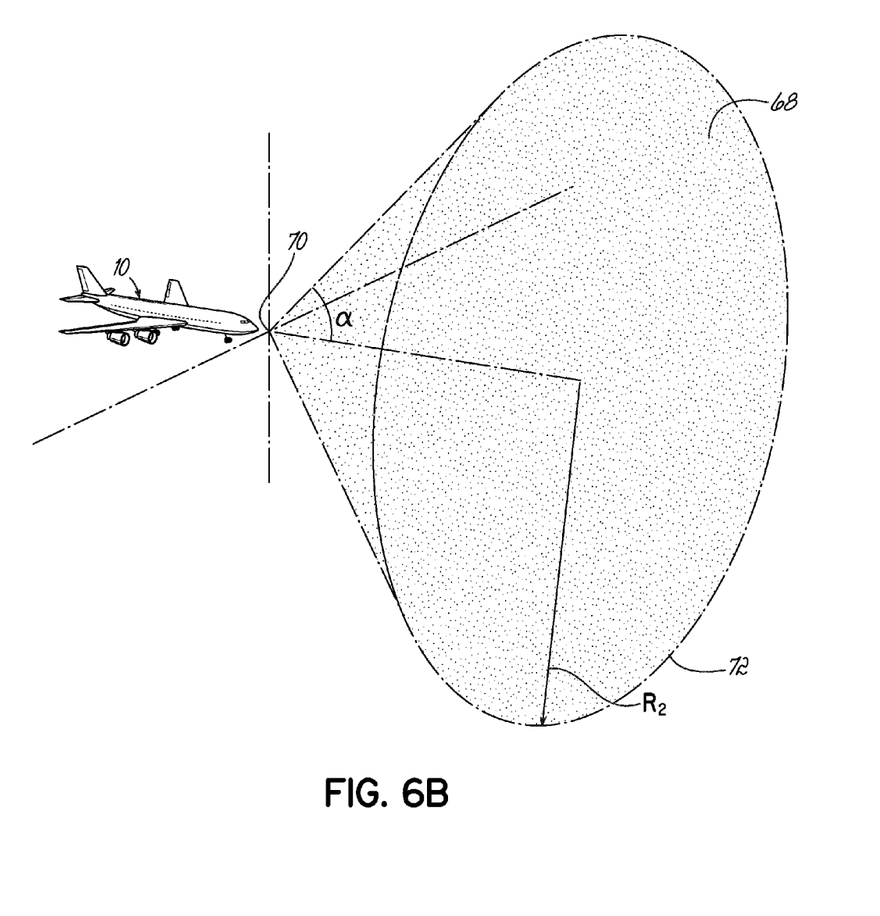

In FIG. 6B, an intersection volume 68 according to another embodiment is shown and is conical in shape with an apex 70 centered on the heading vector (not shown). The conical volume 68 extends from the trailing aircraft 10 at an angle, $\alpha$, relative to the heading vector to a base 72 having a radius, $R_2$. The distance from the trailing aircraft 10 to the base 72 may be designated any distance that provides a safe spatial distance for wake turbulence avoidance.

In use, the conical volume 68 may be better at predicting likely turbulence instead of possible turbulence as compared to the semi-cylindrical volume 64. For example, the conical volume 68 provides more precise estimation of possible turbulence, with fewer false positives of interactions (determination of interactions, according to one embodiment of the present invention described below), particularly in those situations in which the leading aircraft 14a, 14b (FIG. 1) crosses the volume 68 twice, flying in opposite directions but at different altitude. This situation is common when one of the aircrafts (trailing or leading) is making its final approach and the other is flying its base leg in preparation of turning onto its final approach.

If so desired, the intersection volume 64, 68 may further extend to a time-dimension, such as in a hypervolume. In that regard, nearby wake turbulence generated within a designed time period, such as three minutes, would dissipate.

It would be appreciated by those of ordinary skill in the art in view of the disclosure provided herein that the intersection volume 64, 68 may vary over the course of a flight plan. For instance, a first volume may be provided during take-off, a second volume during in-flight cruise, and a third volume during final approach. The third volume, in some instances, may be the same as the first volume.

Figure 7:
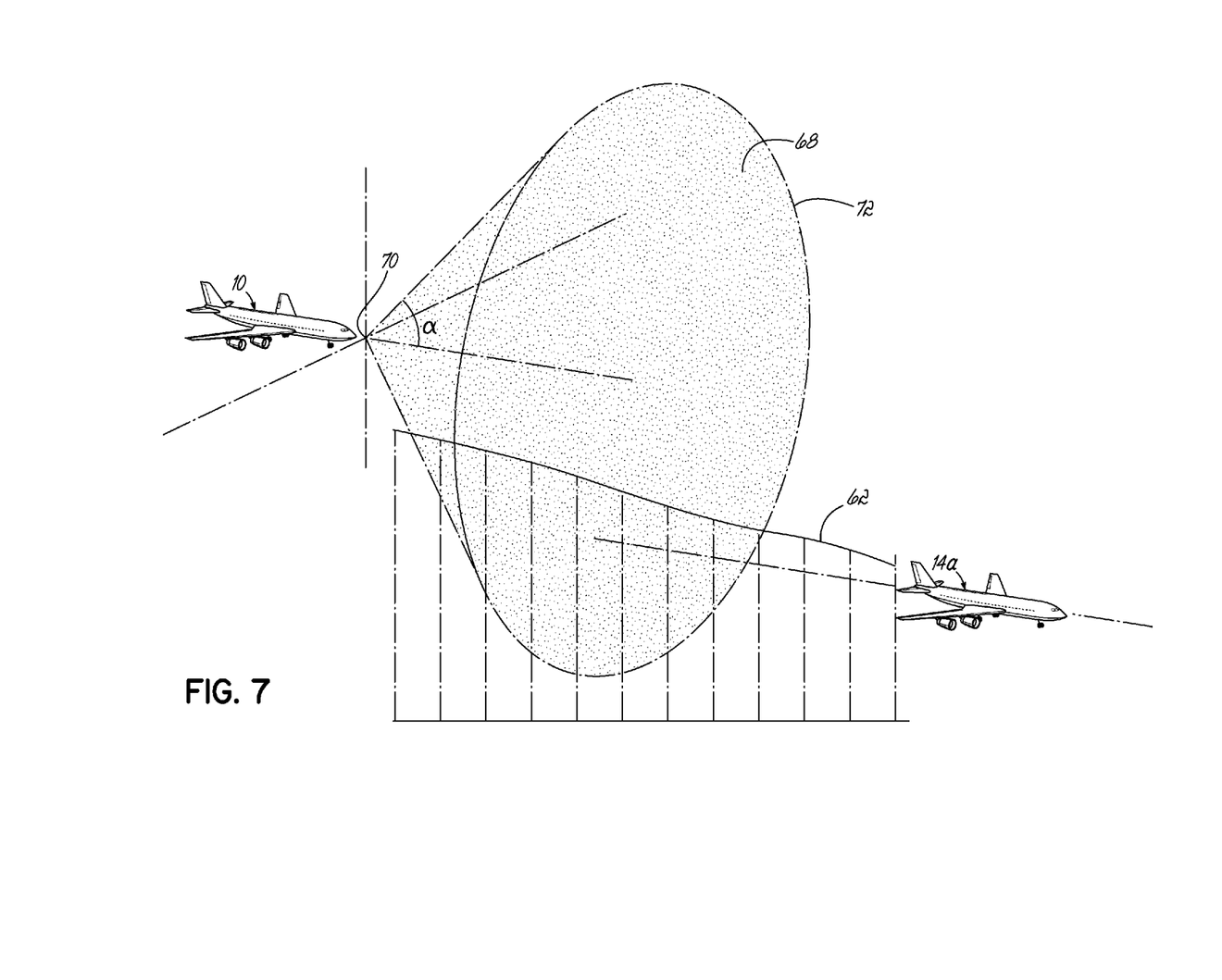
FIG. 7 is a schematic illustration of an intersection of an intersection volume of a trailing aircraft with the wake turbulence boundary of a leading aircraft.

As shown in FIG. 7, the intersection volume 68 of the trailing aircraft 10 may come into contact with the wake turbulence boundary 62 of a leading aircraft 14a, which may lead to flight disturbances in the trailing aircraft 10 and create a potentially dangerous flight situation. Thus, and to notify a pilot of the trailing aircraft 10 of the potential danger, the interaction between the intersection volume 68 of the trailing aircraft 10 with the wake turbulence boundary 62 of the leading aircraft 14a may be determined One such method of determining the intersection of volumes, known as computational geometry, may be used; however, a number of other computational methods known to those of ordinary skill in the art may also be used. For example, geometric intersections may be determined by using a separating axis theorem.

If, for example, the computer 30 (FIG. 3) of the trailing aircraft 10, using a computational geometry algorithm, including, for example, point inclusion, ray intersection, and volume intersections, determines that at least one intersection between the intersection volume 68 and the wake turbulence boundary 62 exists, then a warning flag may be returned to the pilot of the trailing aircraft 10. The warning flag, although not shown, may include any visual, audible, or other sensory indicator that is presented to the pilot to draw the pilot's awareness to the danger of possible turbulence due to wake. Otherwise, and if no intersection exists, then no flag is returned and the pilot may consider the current flight plan to be void of disturbances due to wake turbulence.

Provided the disclosure and teachings herein, one or ordinary skill in the art will readily appreciate that each aircraft 10, 14a, 14b may independently determine possible intersections for evaluating potential disturbances due to the other aircraft 10, 14a, 14b. In that regard, the labels as provided herein as "leading" and "trailing" are arbitrary and depend on the perspective of a particular aircraft. Furthermore, and while determination of the intersections has been described with respect to one leading and one trailing aircraft, any number of leading aircraft may be evaluated, in turn or simultaneously, and in real time, to ensure safe air travel. Still, other objects of interest, besides leading aircraft, may transmit a signal indicative of a volume in which interaction with the intersection volume of the trailing aircraft may be determined. Examples may include cellular phone towers, high-power lines, or other towering objects that may present an obstacle to a flying aircraft.

It will also be appreciated from the teachings herein that the leading aircraft 14a may transmit signals, via a transmitter (illustrated as "Tx" 80 in FIG. 4) in accordance with the ADS-B output signal and/or other signal(s) indicative of its own wake turbulence boundary 62. In the former, a trailing aircraft 10 may receive via a receiver (illustrated as "Rx" 82 in FIG. 4) and determine the leading aircraft's wake turbulence boundary 62 prior to the computational geometric calculation; in the latter, the trailing aircraft 10 may immediately proceed to the computational geometric calculation.

Figure 4:
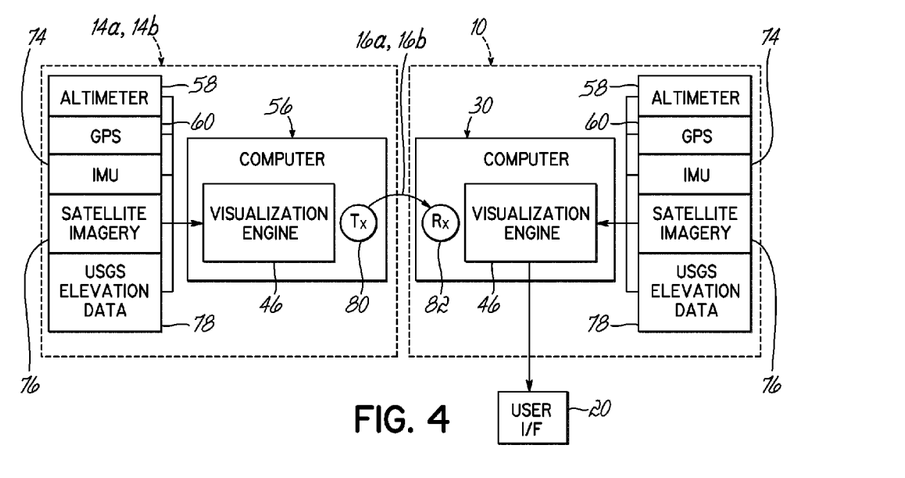
FIG. 4 is a schematic illustration of inputs and outputs of the computers of leading and trailing aircrafts in accordance with one embodiment of the present invention.

Returning again to the figures, and in particular to FIGS. 2, 4, and 7, once the intersection volume 68 and the wake turbulence boundary 62 are determined, and to provide visualize feedback to the pilot of the trailing aircraft 10, the STEAMiE visualization engine may generate and output such visualization to the user interface 20. The visualization may be a graphical representation including, for example, a wake turbulence strip in which the altitude of nearby wake turbulence may be presented with a conventional altimeter, such as the Heads-Up-Display ("HUD"), such as those found in Honeywell's SmartView flight display and MICROSOFT Flight Simulator 2011. Additionally or alternatively, the visualization may include a virtual world illustrative the one or more of the leading aircraft 14a, the wake turbulence boundary 62, the intersection volume 64, 68, the aircraft's own wake turbulence, and geographical landmarks. As such the computer 30, 56 of the aircraft may acquire signals from the aircraft's inertial movement unit (illustrated as "IMU" 74), the aircraft's elevation data (one example of which may be acquired in accordance with standards provided by the U.S. Geological Survey of the U.S. Department of the Interior) (illustrated as "USGS ELEVATION DATA 78"), and satellite imagery 76, which may be received from commercial vendors, such as MICROSOFT Bing Maps Platform.

The visualization engine 46 is configured to generate a virtual representation from these additional signals, along with the intersection information as described above, for display to the pilot.

Figure 8:
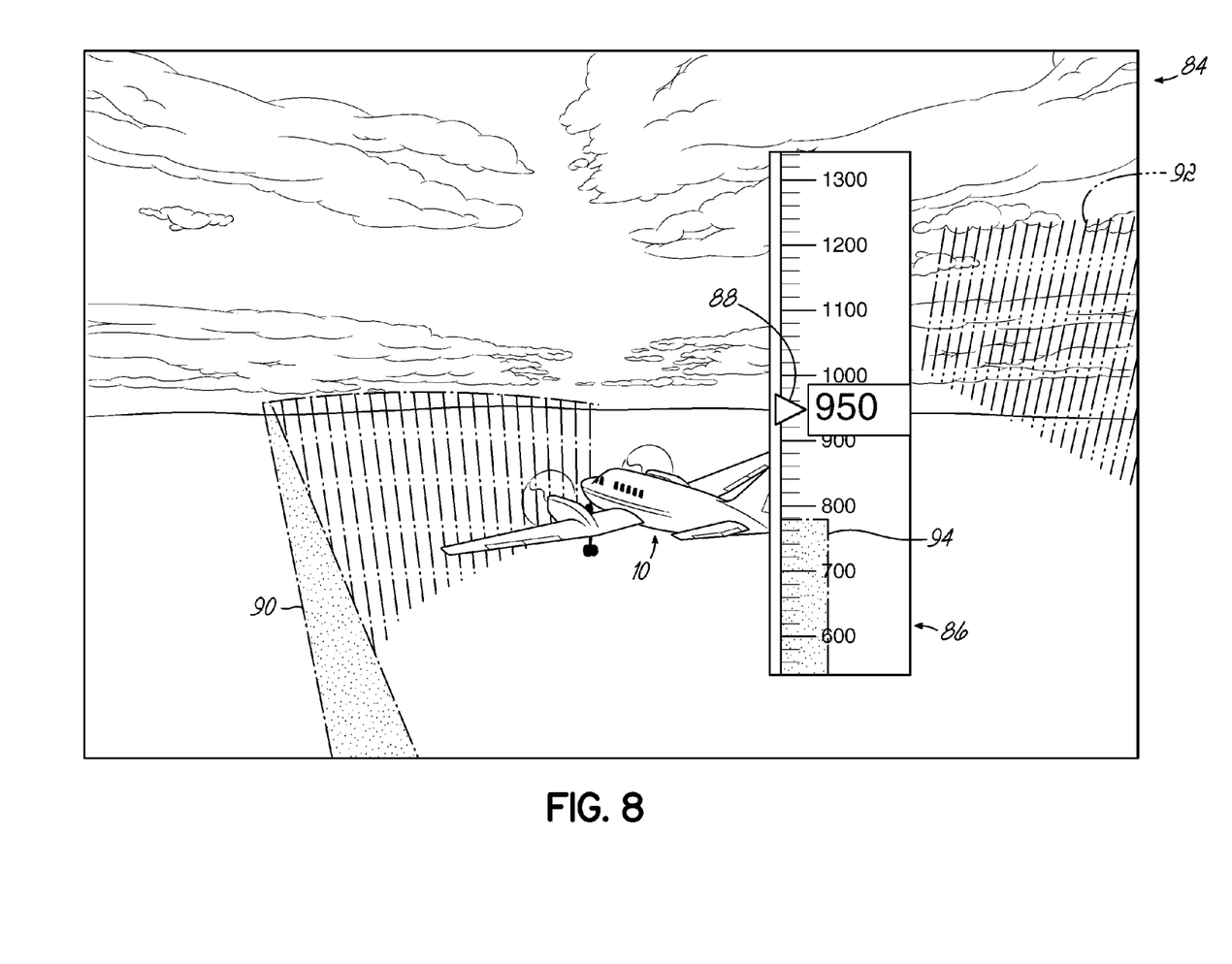
FIGS. 8-10 are schematic representations of wake turbulence avoidance altimeter and graphical displays in accordance with examples of embodiments of the present invention.
Figure 9:
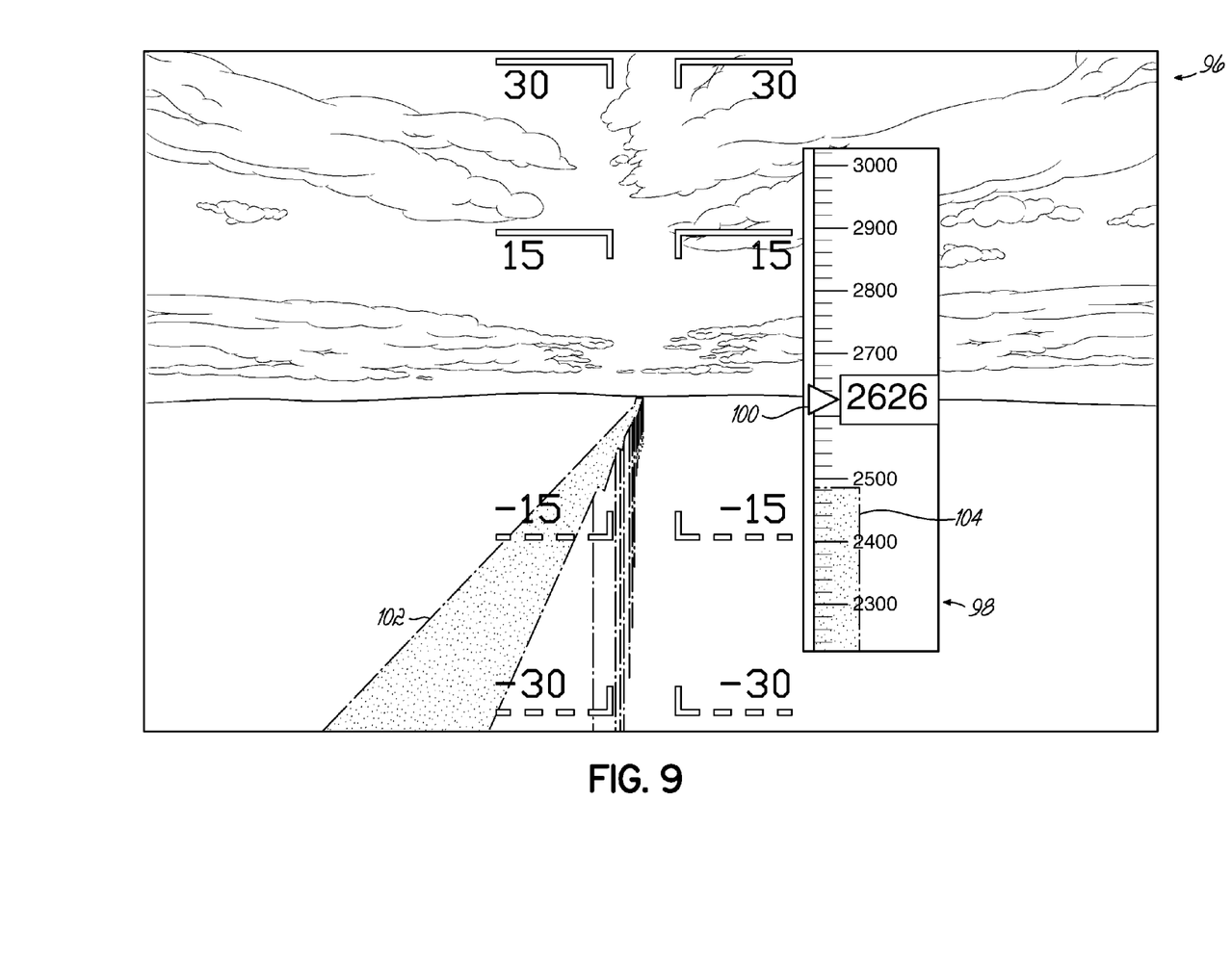
Figure 10:
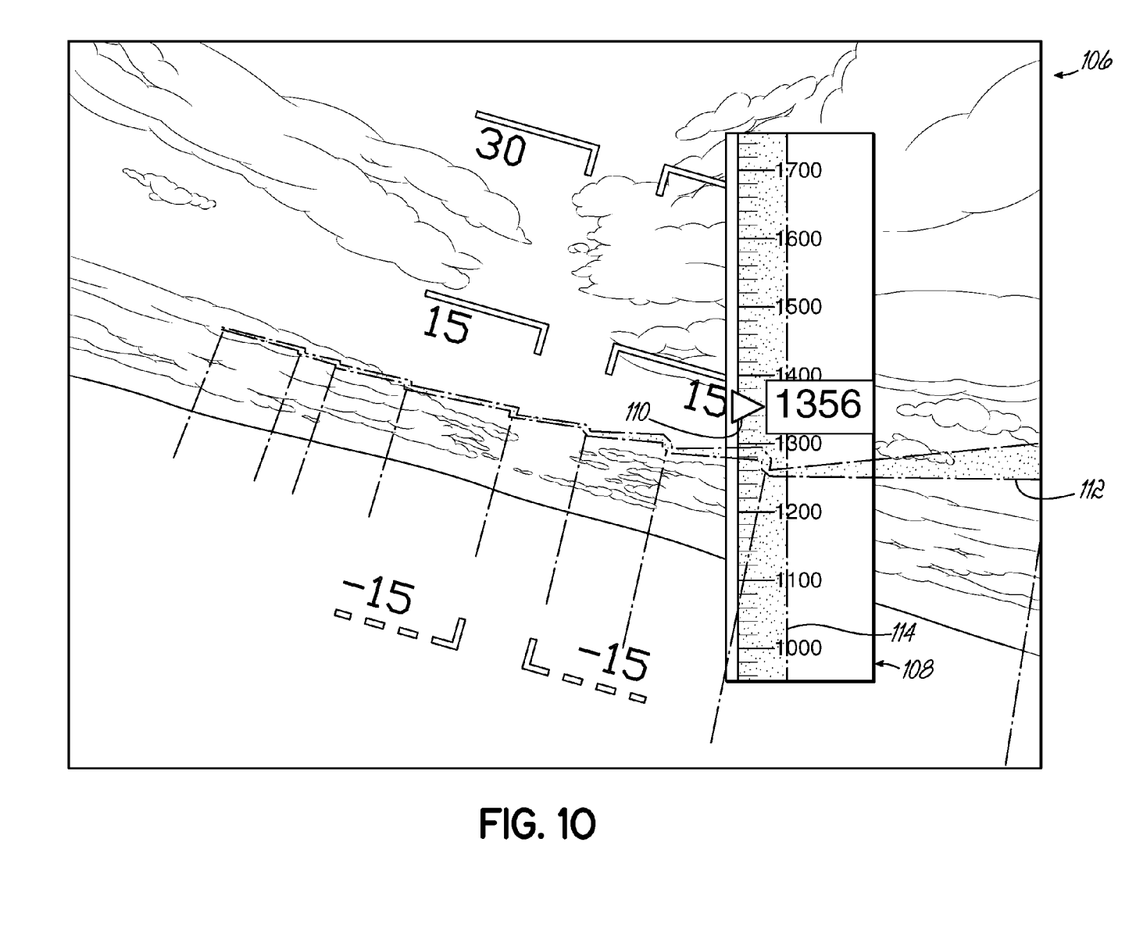

The following non-limiting examples, provided in FIGS. 8-10, illustrate virtual world and graphical representations resulting from the use of the invention for particular applications.

EXAMPLE 1

A prototypical application of the invention, one leading aircraft, and one trailing aircraft, was tested at Ohio University's Snyder Filed ("UNI") in May 2011. The altimeters used gave a 10 ft resolution at 1 Hz. The leading aircraft's GPS update frequency was 1 Hz, and its 329 MHz/1200 baud transmitter sent a pseudo ADS-B signal to the trailing aircraft at a frequency of 5 Hz; however, it was determined that with the higher transmit frequency only 1 out of 5 transmissions needed to be received by the trailing aircraft. The trailing aircraft's GPS was integrated with a 100 Hz inertial unit and, with a Kalman filter, interpolated the GPS position at 100 Hz. Therefore, the trailing aircraft moved with a smooth position and orientation.

The virtual world display was displayed at 60 Hz to the pilot of the trailing aircraft and was substantially similar to commercially-available flight simulation software.

As shown in the virtual world representation 84 of FIG. 8, a wake avoidance altimeter 86 having an arrow 88 indicating that the trailing aircraft 10 is flying at an altitude of about 950 ft. The wake turbulence boundary 90 of the leading aircraft (leading aircraft is not shown in FIG. 8) as well as the wake turbulence boundary 92 of the trailing aircraft 10 are displayed. The trailing aircraft 10 and its wake turbulence boundary 92 are visible in the virtual world representation 84 because the trailing aircraft 10 performed a 180° maneuver.

The altimeter 86 includes a wake turbulence bar 94, representing the wake turbulence boundary 90 of the leading aircraft, which tops out at about 780 ft.

EXAMPLE 2

FIG. 9 illustrates a virtual world representation 96 with a wake avoidance altimeter 98 having an arrow 100 indicating that the trailing aircraft (not shown in FIG. 9) is flying at an altitude of about 2626 ft and converging on the runway. The leading aircraft's wake turbulence boundary 102, which tops out at about 2480 ft, is shown in the virtual world representation 96 as well as on the altimeter 98 as a wake turbulence bar 104.

EXAMPLE 3

FIG. 10 illustrates a virtual world representation 106 with a wake avoidance altimeter 108 having an arrow 110 indicating that the trailing aircraft (not shown in FIG. 10) is flying at an altitude of about 1356 ft. The leading aircraft is maneuvering directly into the wake turbulence boundary 112 of the leading aircraft (the leading aircraft is not shown in FIG. 10) and likely into potentially dangerous wake. The wake turbulence bar 114 indicates that the leading aircraft's wake turbulence potentially extends from at least 600 ft to more than about 1750 ft.

As provided in detail herein, computer methods for evaluating relations between a wake generated by a leading aircraft and a trailing aircraft include receiving at least one signal from the leading aircraft and transforming that signal into a wake turbulence boundary. The trailing aircraft is evaluated against the wake turbulence boundary, for example, intersections between a flight plan or intersection volume of the trailing aircraft with the wake turbulence boundary are determined. The trailing aircraft may be alerted to possible danger when and if a determined intersection exists.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A computer method for determining potential wake turbulence for a first aircraft resulting from a wake generated by a second aircraft, the computer method comprising;
   receiving a signal generated by the second aircraft at the first aircraft;
   transforming the signal to a wake turbulence boundary representing the wake generated by the second aircraft;
   selecting an intersection volume associated with the first aircraft and representing a zone of dangerous turbulence interactions for the first aircraft, wherein the intersection volume at least partially surrounds the first aircraft and has a shape that extends away from the first aircraft to provide a safe spatial distance for wake turbulence avoidance;
   determining an intersection of the wake turbulence boundary and the intersection volume;
   displaying, with an altimeter of a Heads-Up-Display, an altitude of the first aircraft; and
   positioning a wake turbulence bar on the altimeter of the Heads-Up-Display to indicate the altitude of the wake turbulence boundary, whereby the positioning of the wake turbulence bar on the altimeter of the Heads-Up-Display causes a reduced cognitive load by the operator to determine the altitude of the wake turbulence boundary relative to the altitude of the first aircraft with comparison to a separate map.

2. The computer method of claim 1, further comprising: issuing a warning flag when the altitude of the first aircraft coincides with the altitude of the wake turbulence boundary.

3. The computer method of claim 2, wherein the warning flag is a visual, an audible, or other sensory indicator that is presented to the operator to draw the operator's awareness to the danger of possible turbulence due to the wake.

4. The computer method of claim 1, wherein the signal generated by the second aircraft includes at least one signal indicating at least one of an altitude of the second aircraft, a global position of the second aircraft, an orientation of the second aircraft, an elevation of the second aircraft, or a combination thereof.

5. The computer method of claim 1, wherein transforming the signal to the wake turbulence boundary includes receiving an Automatic Dependent Surveillance-Broadcast Out signal from the second aircraft.

6. The computer method of claim 1, further comprising:
   receiving a satellite image corresponding to a position of the first aircraft; and
   generating a visual display including at least one of the wake turbulence boundary and the intersection volume, the visual display being layered over the satellite image.

7. The computer method of claim 1, wherein the shape of the intersection volume is a semi-cylindrical shape having a lengthwise axis aligned with the gravitational force and centered on a heading vector of the first aircraft, the semi-cylindrical shape having a first radius that provides a safe spatial distance for wake turbulence avoidance.

8. The computer method of claim 1, wherein the shape of the intersection volume is a conical shape with an apex centered on a heading vector, the conical shape extending from the first aircraft at an angle relative to the heading vector to a base having a first radius, wherein the distance from the first aircraft to the base provides a safe spatial distance for wake turbulence avoidance.

9. The computer method of claim 1, wherein determining the intersection of the wake turbulence boundary and the intersection volume is obtained using a computational geometry algorithm.

10. The computer method of claim 9, wherein the computational geometry algorithm is at least of point inclusion, ray intersection, or volume intersection.

11. A computer method for a first aircraft to avoid a wake turbulence resulting from a wake generated by a second aircraft, the computer method comprising;
generating a wake turbulence boundary representing the wake turbulence generated by the second aircraft;
determining whether a flight plan of the first aircraft intersects with the wake turbulence boundary of the second aircraft, wherein the flight plan includes an intersection volume associated with the first aircraft and represents a zone of dangerous turbulence interactions for the first aircraft;
displaying, on an altimeter of a Heads-Up-Display, an altitude of the first aircraft; and
positioning a wake turbulence bar on the altimeter of the Heads-Up-Display to indicate an altitude of the wake turbulence boundary relative to the altitude of the first aircraft, whereby positioning the wake turbulence bar on the altimeter of the Heads-Up-Display causes a reduced cognitive load by the operator to determine the altitude of the wake turbulence boundary relative to the altitude of the first aircraft with comparison to a separate map.

12. The computer method of claim 11, wherein generating the wake turbulence boundary includes receiving a signal by the first aircraft that is generated by the second aircraft, the signal including at least one of an altitude of the second aircraft, a global position of the second aircraft, an orientation of the second aircraft, an elevation of the second aircraft, or a combination thereof.

13. The computer method of claim 11, wherein generating the wake turbulence boundary includes receiving an Automatic Dependent Surveillance-Broadcast Out signal from the second aircraft.

14. The computer method of claim 11, wherein the intersection volume has a conical shape with an apex centered on a heading vector, the conical shape extending from the first aircraft at an angle relative to the heading vector to a base having a first radius, wherein the distance from the first aircraft to the base provides a safe spatial distance for wake turbulence avoidance.

15. A wake visualization instrument of a first aircraft, comprising;
a receiver configured to receive at least one signal generated by a second aircraft;
a computer configured to transform the at least one signal into a wake turbulence boundary representing wake generated by the second aircraft and to determine a relation between the wake turbulence boundary and the first aircraft; and
a Heads-Up-Display including an altimeter and a wake turbulence bar,
wherein the altimeter is configured to display an altitude of the first aircraft, and
wherein the wake turbulence bar is positioned on the altimeter of the Heads-Up-Display and configured to indicate the altitude of the wake turbulence boundary relative to the altitude of the first aircraft,
whereby positioning the wake turbulence bar on the altimeter of the Heads-Up-Display causes a reduced cognitive load by the operator to determine the altitude of the wake turbulence boundary relative to the altitude of the first aircraft with comparison to a separate map.

16. The wake visualization instrument of claim 15 further comprising a visual display, and the altimeter is a graphical representation on the visual display.

17. The wake visualization instrument of claim 16, wherein the visual display further includes a satellite image corresponding to a position of the first aircraft.

* * * * *

UNITED STATES PATENT AND TRADEMARK OFFICE
CERTIFICATE OF CORRECTION

PATENT NO.        : 9,709,698 B2
APPLICATION NO.   : 14/125132
DATED             : July 18, 2017
INVENTOR(S)       : Scott Larson Nykl et al.

It is certified that error appears in the above-identified patent and that said Letters Patent is hereby corrected as shown below:

Column 2,
Line 8, "aircraft includes" should be -- aircraft and includes --.
Line 22, "aircraft includes" should be -- aircraft and includes --.
Line 32, "aircraft includes" should be -- aircraft and includes --.
Line 43, "aircraft includes" should be -- aircraft and includes --.

Column 3,
Line 27, "operably" should be -- operable --.

Column 5,
Line 28, "comprised any of any" should be -- comprised of any --.
Line 32, "replica the aircraft" should be -- replica of the aircraft --.
Line 60, "making of one" should be -- making one --.

Column 6,
Line 10, "aircrafts" should be -- aircraft's --.
Line 11, "may sampled and be evaluated" should be -- may be sampled and evaluated --.
Line 50, "references" should be -- referenced --.

Column 7,
Line 34, "determined" should be -- determined. --.
Line 54, "or" should be -- of --.

Column 8,
Lines 28-29, "illustrative" should be -- illustrating --.
Line 53, "Snyder Filed" should be -- Snyder Field --.

Column 9,
Line 3, "indicating" should be -- indicates --.
Line 65 (Claim 1), "comprising;" should be -- comprising: --.

Signed and Sealed this
Third Day of July, 2018

Andrei Iancu
*Director of the United States Patent and Trademark Office*

CERTIFICATE OF CORRECTION (continued)
U.S. Pat. No. 9,709,698 B2

Column 11,
Line 3 (Claim 11), "comprising;" should be -- comprising: --.

Column 12,
Line 7 (Claim 15), "comprising;" should be -- comprising: --.